United States Patent [19]

Lenz et al.

[11] Patent Number: 5,327,988

[45] Date of Patent: Jul. 12, 1994

[54] TRUCK HAVING CAB WITH FULL ACCESS ENGINE ENCLOSURE

[75] Inventors: Kenneth C. Lenz, Hudsonville; Daniel J. VanAlten, Grand Rapids, both of Mich.

[73] Assignee: HME, Inc., Wyoming, Mich.

[21] Appl. No.: 949,791

[22] Filed: Sep. 22, 1992

[51] Int. Cl.⁵ ............................................. B62D 33/06
[52] U.S. Cl. ............................ 180/89.18; 180/89.16; 180/89.19; 296/37.6
[58] Field of Search .................. 180/69.2, 69.21, 69.22, 180/69.23, 69.24, 89.1, 89.17, 89.18, 89.13, 89.14, 89.16, 89.19; 296/37.6, 37.8, 190

[56] References Cited

U.S. PATENT DOCUMENTS

| | | | |
|---|---|---|---|
| 1,856,773 | 5/1932 | Masury | 180/89.18 |
| 2,064,100 | 12/1936 | Bachman | 180/54.1 |
| 2,095,058 | 10/1937 | Cross | 180/89.18 |
| 2,116,666 | 5/1938 | Carlson | 180/89.17 |
| 2,151,229 | 3/1939 | Piroumoff et al. | 180/89.18 |
| 2,172,831 | 9/1939 | Carlson | 180/89.17 |
| 2,667,230 | 1/1954 | Duff et al. | 180/89.17 |
| 2,753,947 | 7/1956 | Mach | 180/89.18 |
| 2,781,102 | 2/1957 | Prichard | 180/69.21 |
| 2,857,977 | 10/1958 | Bock | 180/89.18 |
| 3,011,581 | 12/1961 | Wood | 180/89.18 |
| 3,055,699 | 9/1962 | May | 180/89.19 |
| 3,125,179 | 3/1964 | Muller | 180/89.18 |
| 3,451,499 | 6/1969 | Taylor | 180/89.17 |
| 3,583,513 | 6/1971 | Macadam et al. | 180/69.24 |
| 4,506,750 | 3/1985 | Leskovec | 180/69.21 |
| 4,770,263 | 9/1988 | Yoshioka | 180/89.17 |
| 4,915,438 | 4/1990 | Hashimoto et al. | 296/65.1 |

*Primary Examiner*—Karin L. Tyson
*Assistant Examiner*—Kevin Hurley
*Attorney, Agent, or Firm*—Warner, Norcross & Judd

[57] ABSTRACT

A truck having a cab with a full access engine enclosure is disclosed in which the routine maintenance points of the engine may be accessed from within the cab without having to move the seats. The floor of the cab is formed with an opening disposed between the seats or tilt the cab. A housing with upwardly extending walls is affixed to the floor surrounding the opening. The upper extent of the housing is formed with a large opening extending forwardly and rearwardly of the seats. Doors are hinged to the housing for closing and opening the housing opening.

12 Claims, 3 Drawing Sheets

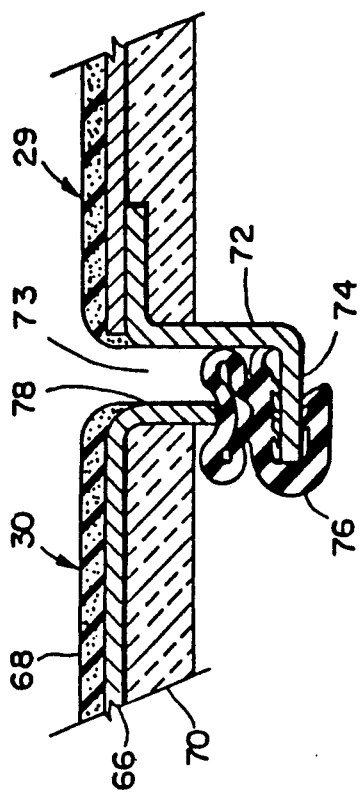
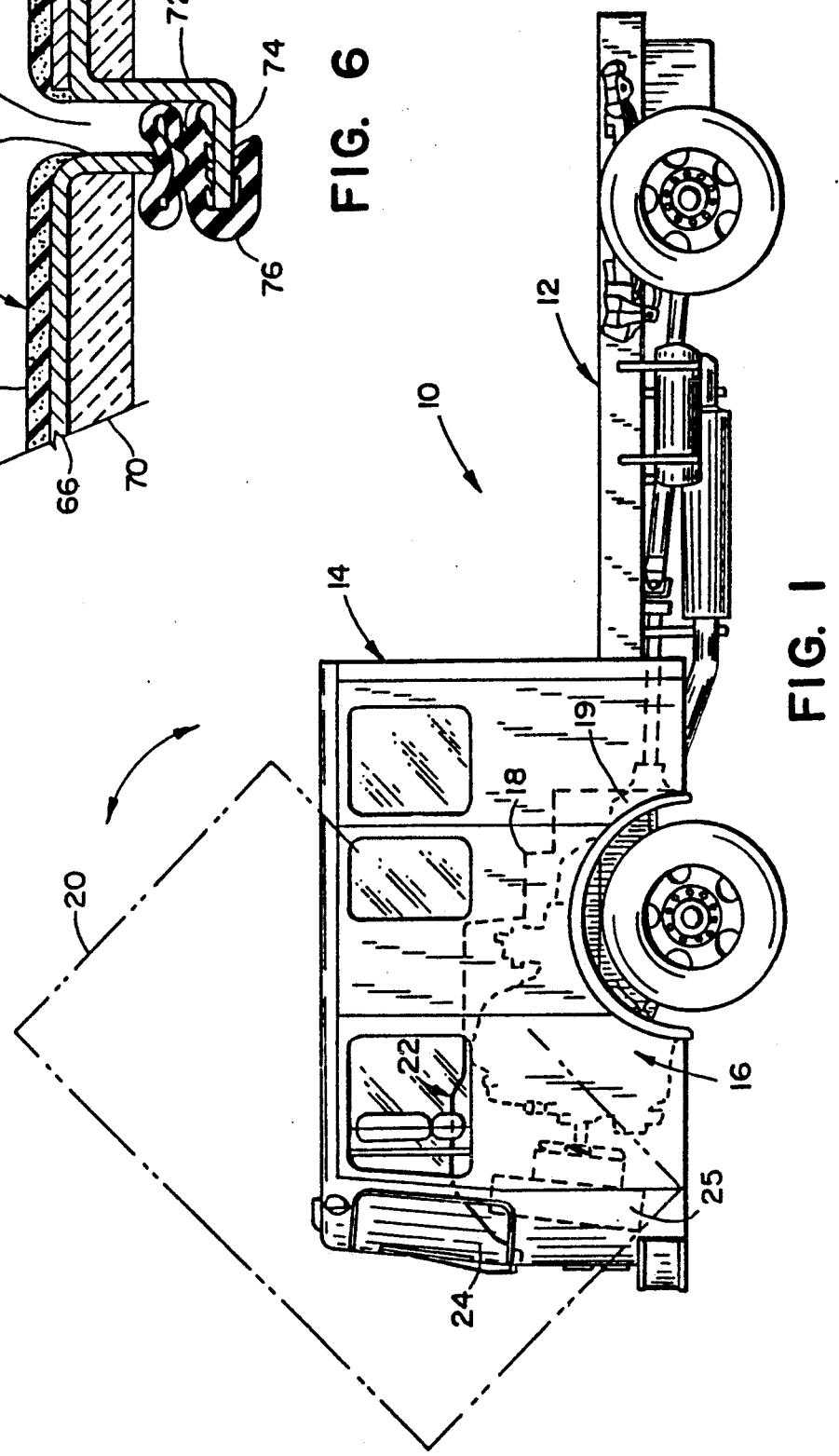

TRUCK HAVING CAB WITH FULL ACCESS ENGINE ENCLOSURE

BACKGROUND OF THE INVENTION

1. Field of the Invention

The present invention relates to a truck and truck cab and, more particularly, to a truck cab having an engine enclosure with an opening giving full access to the routine maintenance points of the truck engine from inside the cab.

2. Description of the Related Art

Cab-over-engine trucks are well known in which the truck engine is situated generally beneath the floor of the truck cab. Such trucks have been constructed with tilt cabs in which the cab is hinged to the front of the truck chassis so that the cab may be tilted forward to allow full access to the engine beneath the cab. In order to provide some degree of access to the engine without having to tilt the cab, truck cabs have been provided with relatively small interior openings which allow limited access to the engine below. These small openings do not allow access to all of the routine maintenance points of the engine from inside the cab.

Other approaches to engine access have included hinged floor panels located at least partially beneath the seats of the cab. While such panels enable a greater degree of access to the engine without having to tilt the cab, they require that the seats be mounted so that they can be moved out of the way before the panel may be opened.

SUMMARY OF THE INVENTION

The present invention provides a truck cab having an engine enclosure which allows full access to the routine maintenance points of the truck engine from inside the cab without having to move the seats or in any other way rearrange the cab interior. According to the invention, the engine enclosure is situated between the seats. The engine enclosure has hinged doors covering a large opening extending over the radiator and most of the engine including the routine maintenance points of the engine. Thus, the engine enclosure of the invention allows for servicing of maintenance points such as the engine oil, transmission fluid, engine coolant, power steering fluid, and fan belt without having to tilt the cab or move the seats.

These and other objects, advantages, and features of the present invention will be more fully understood and appreciated by reference to the written specification and appended drawings.

BRIEF DESCRIPTION OF THE DRAWINGS

FIG. 1 is a side elevational view of a truck having an engine enclosure according to the principles of the invention;

FIG. 6 is a fragmentary, enlarged, sectional, end elevational view showing the adjacent edges of a door and the housing of the engine enclosure.

DESCRIPTION OF THE PREFERRED EMBODIMENT

Figure 2:
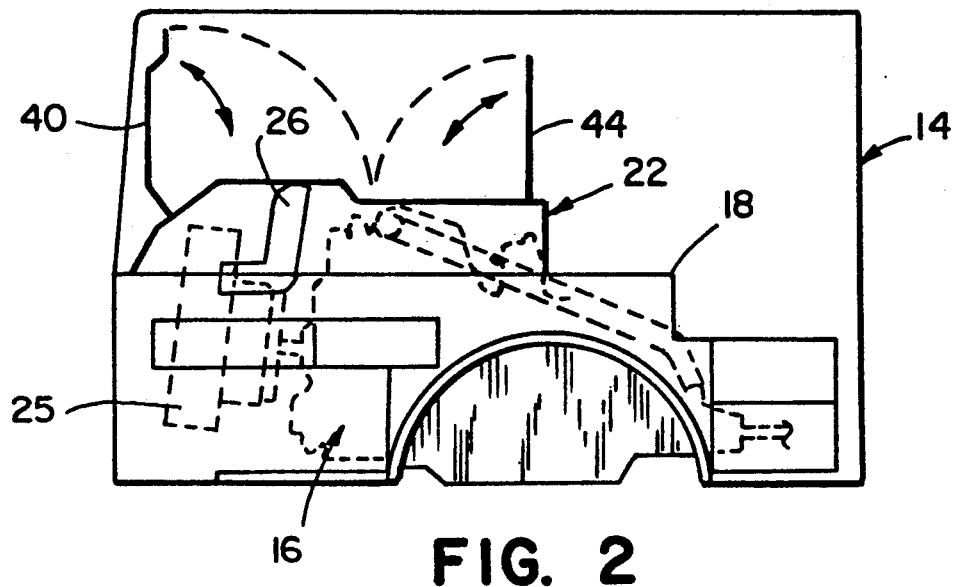
FIG. 2 is a somewhat diagrammatic side elevational view of the interior of the truck cab.

By way of disclosing a preferred embodiment, and not by way of limitation, there is shown in FIG. 1 a cab-over-engine type truck 10 having a longitudinally extending chassis 12, a cab 14 mounted generally above the front end of the chassis, and an internal combustion engine 16 mounted to the chassis generally within the cab and below the floor 18 of the cab. The cab extends rearwardly beyond the engine 16 and transmission 19. The front of the cab 14 is mounted to the chassis on hinges which allow the cab to be tilted forward, as shown in broken lines at 20, to allow full access to the engine when extensive servicing of the engine is needed.

Figure 3:
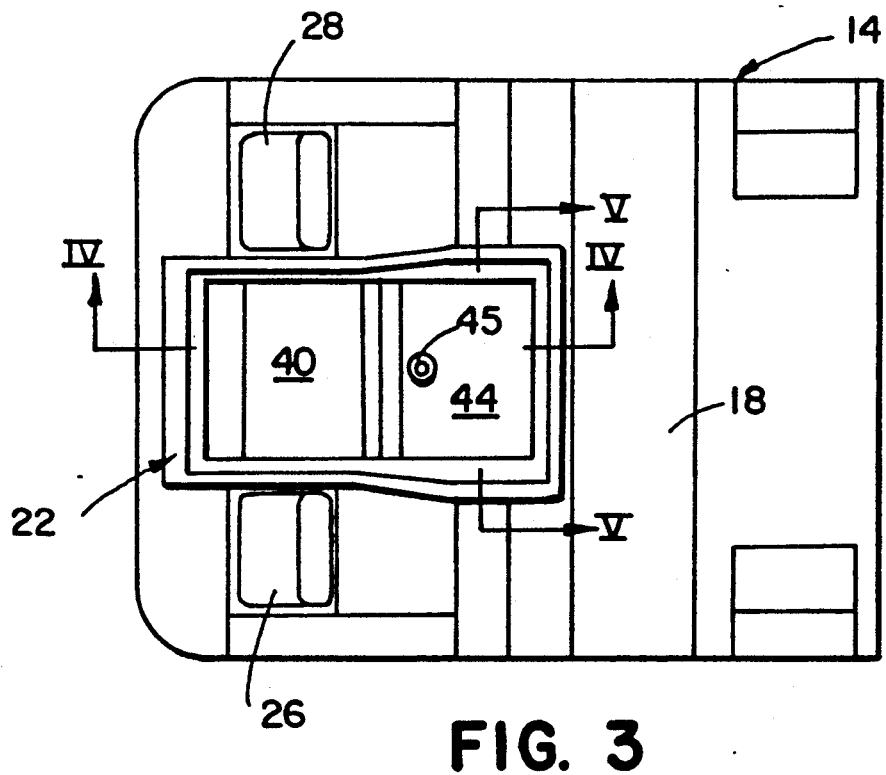
FIG. 3 is a somewhat diagrammatic plan view of the interior of the truck cab.

Referring also to FIGS. 2 and 3, engine enclosure 22 is located within the cab 14, and is affixed to the cab floor 18. The enclosure extends longitudinally from a short distance behind the windshield 24 and in front of the radiator 25 to a point rearwardly behind most of the engine 16. A pair of transversely spaced apart front seats 26, 28 are mounted to the floor of the cab. Engine enclosure 22 is disposed transversely between the seats 26, 28, and extends longitudinally forwardly and rearwardly beyond the seats.

Figure 4:
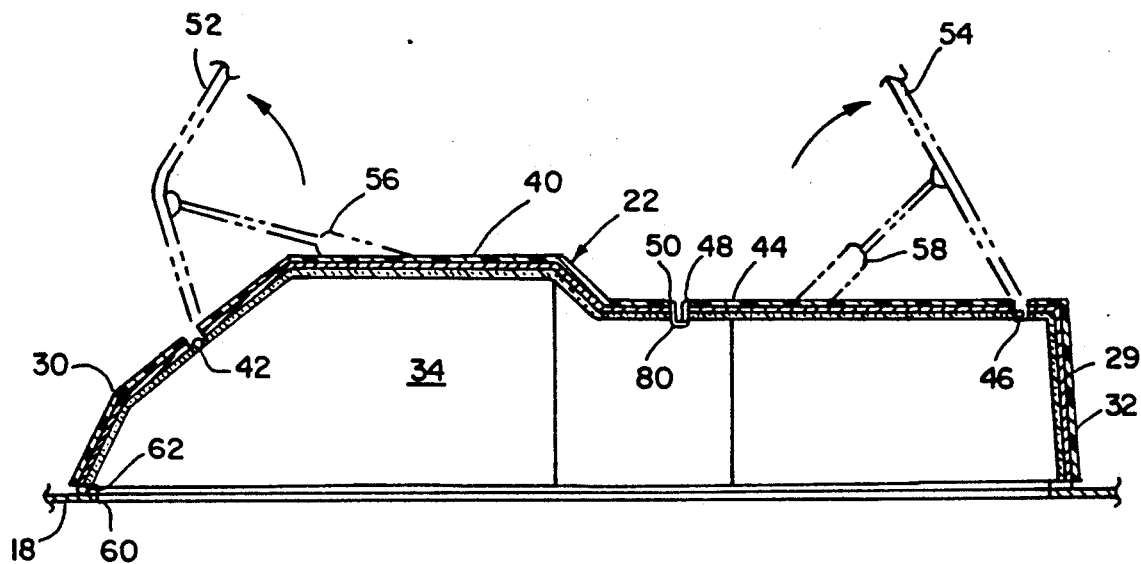
FIG. 4 is a sectional, side elevational view of the engine enclosure taken substantially along the line IV—IV of FIG. 3.
Figure 5:
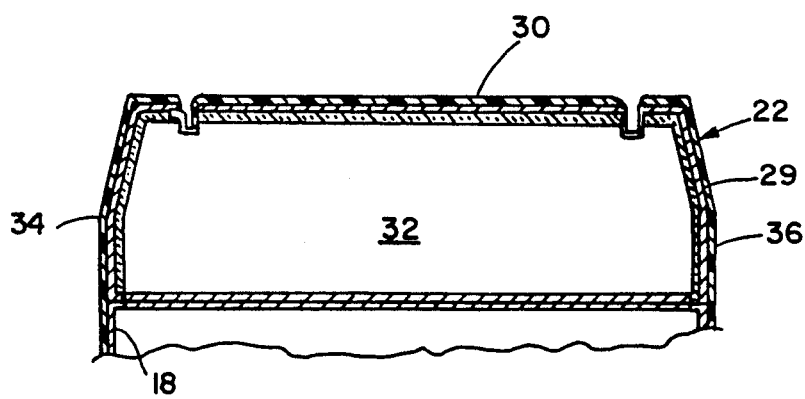
FIG. 5 is a sectional, end elevational view of the engine enclosure taken substantially along the line V—V of FIG. 3.

The engine enclosure 22 is generally rectangular in plan, with the rear extent being slightly widened. Referring also to FIGS. 4 and 5, the engine enclosure 22 includes a housing 29 having front and rear upwardly extending walls 30, 32, and left and right upwardly extending side walls 34, 36. The walls surround a large central enclosure opening which, as shown in FIG. 2, extends from forward of the radiator 25 to the rear of most of the engine 16. The size and location of the engine enclosure opening are advantageously selected such that the routine maintenance points of the engine may be reached from the interior of the cab through the opening. Such maintenance points preferably include the engine oil dipstick and filler hole, the transmission fluid dipstick and filler hole, the radiator and engine coolant filler hole, power steering fluid filler hole, and the tension adjustment devices for the fan belt and various other belts of the engine.

Referring also to FIG. 4, a front door 40 is connected by a transversely extending hinge 42 to the upper edge of the housing front wall 30. A rear door 44 is connected by a transversely extending hinge 46 to the upper edge of the housing rear wall 32. Each door is generally rectangular in plan, with the front door 42 being bent into an upwardly arching shape conforming with a similarly upwardly arching shape of the forward extent of the housing 29. When closed, the forward edge 48 of the rear door 44 meets the rear edge 50 of the front door across a central portion of the housing to fully close the opening of the engine enclosure. As shown in FIG. 3, the rear door 44 is fitted with a latch 45 which secures the doors in the closed position.

To access the engine, the doors are pivoted upwardly and apart from each other as shown at 52, 54 in FIG. 4. Gas spring cylinders 56, 58 are provided extending between the housing 29 and each of the doors to assist in lifting the doors and to hold the doors in the open position. As shown in FIG. 2, the use of a pair of doors enables both doors to be fully raised without interference with the ceiling of the cab. However, certain cab configurations may have sufficient head room to allow the use of a single door, and it is within the scope of the invention to use such a single door.

As shown in FIGS. 4 and 5, the floor 18 of the cab is formed with a floor opening 60 generally coextensive with the bottom opening 62 of the engine enclosure. Like the upper opening of the enclosure, the floor opening is of sufficient size to allow access to the routine maintenance points of the engine. The bottom perimeter of the housing is affixed to the perimeter of the floor surrounding the opening 62 by suitable means such as weldments.

Additional details of the engine enclosure are shown in FIG. 6. The housing and the doors are each made of metal plate 66 covered on the outside by padded upholstery 68, and lined on the inside with an insulating, heat resistant, and foil-faced material 70. A Z-shaped flange 72 is affixed to the perimeter of the housing 29 surrounding the upper opening 73 of the housing. The lower leg 74 of the Z-shaped flange extends into and below the perimeter of the upper opening. A resilient gasket 76 is affixed to and above the lower leg 74. The edges of the door panels are formed with downwardly turned rims 78 which rest upon and seal against the gasket 76. The rear edge 50 of the front door 40 is similarly fitted with a Z-flange 80 (FIG. 4) and a gasket which form a seal with a rim on the forward edge 48 of the rear door 44.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A truck comprising:
   a longitudinally extending chassis;
   an engine having routine maintenance points and supported on said chassis;
   a cab enclosing said engine and having a floor disposed generally above said chassis, said floor defining a floor opening, said engine extending through said opening;
   two seats mounted to said floor of said cab and transversely spaced from one another across said floor opening;
   an engine enclosure housing affixed to said floor and surrounding said floor opening, said enclosure housing having sidewalls defining an upwardly directed enclosure opening, said enclosure opening being located and of sufficient size to allow access to said routine maintenance points of said engine; and
   door means hingedly affixed to said enclosure housing about a generally horizontal axis for opening and closing said enclosure opening, whereby said door means may be opened by moving said door means upwardly about said generally horizontal axis and said maintenance points of said engine may be accessed through said enclosure opening without the necessity for moving either of said seats.

2. The truck of claim 1 wherein said engine enclosure housing extends longitudinally forwardly and rearwardly beyond said seats.

3. The truck of claim 1 wherein said door means comprises a front door hingedly affixed to the forward extent of said engine enclosure housing and a rear door hingedly affixed to the rearward extend of said housing.

4. The truck of claim 1 wherein said engine enclosure housing further includes a peripheral flange surrounding said enclosure opening, and further comprising a resilient gasket carried on said peripheral flange, wherein said door means seals against said gasket when said door means is closed.

5. A truck comprising:
   a longitudinally extending chassis;
   an engine having routine maintenance points and mounted to the forward extent of said chassis;
   a cab mounted to the forward extent of said chassis and surrounding said engine and having a floor disposed generally above said chassis, said floor formed with an floor opening positioned and of sufficient size to allow said engine to extend therethrough, said cab being hingedly mounted to said chassis such that said cab may be tilted forwardly and upwardly to provide access to said engine;
   an engine enclosure including:
   a housing affixed to said floor and having a plurality of upwardly extending walls surrounding said floor opening, the upper extents of said walls defining an enclosure opening, said enclosure opening being of sufficient size to allow access to said routine maintenance points of said engine from the interior of said cab;
   at least one door hingedly affixed to the upper extent of one of said walls, said door being pivotable to selectably close or open said enclosure opening; and
   at least one seat mounted to said floor and disposed laterally to the side of said engine enclosure, whereby said door may be opened and closed and access may be made to the routine maintenance points of the engine through said enclosure opening without the necessity for moving said seat.

6. In a truck of the type having a longitudinally extending chassis, an engine having routine maintenance points and supported on the chassis, a cab enclosing the engine and having a floor disposed generally above the chassis, said floor defining a floor opening through which the engine extends, said cab being hingedly connected to said chassis such that said cab may be tilted upwardly, and at least one seat mounted to the floor of the cab, the combination therewith of an engine enclosure comprising:
   a housing affixed to the floor and having upwardly extending walls surrounding an enclosure opening, said seat disposed transversely to the side of said housing, said enclosure opening being located and of sufficient size to allow access to the routine maintenance points of the engine;
   door means hingedly affixed to said housing for opening and closing said enclosure opening;
   whereby said door means may be opened and said maintenance points of the engine may be accessed through said opening without the necessity for moving said seat.

7. A truck comprising:
   a longitudinally extending chassis;
   an engine having routine maintenance points and mounted on said chassis;
   a cab mounted on said chassis and surrounding said engine and having a floor disposed generally above said chassis, said floor formed with a floor opening positioned and of sufficient size to allow said engine to extend therethrough;

an engine enclosure including:

a housing affixed to said floor and having a plurality of upwardly extending walls surrounding said floor opening, the upper extents of said walls defining an upwardly directed enclosure opening, said enclosure opening being of sufficient size to allow access to said routine maintenance points of said engine from the interior of said cab;

at least one door hingedly affixed to the upper extent of one of said walls, said door being pivotable about a generally horizontal axis to selectably close or open said enclosure opening; and two seats mounted to said floor laterally spaced from one another on opposite sides of said engine enclosure, whereby said door may be opened by moving the door up and closed by moving the door down and access may be made to said routine maintenance points of said engine through said enclosure opening without the necessity for moving either of said seats.

8. The truck of claim 7 further comprising upholstery material covering the outside surface of said engine enclosure.

9. The truck of claim 7 wherein said housing extends longitudinally forwardly and rearwardly beyond said seats.

10. The truck of claim 9 wherein said at least one door comprises a front door and a rear door, said plurality of upwardly extending walls includes a transversely extending front wall and a transversely extending rear wall longitudinally spaced apart from said front wall, wherein said front door is hingedly affixed to the upper extent of said front wall, said rear door is hingedly affixed to the upper extent of said rear wall, and wherein said front and rear doors meet across a central extent of said housing when said doors are closed.

11. The truck of claim 10 wherein said engine enclosure further comprises a peripheral flange surrounding said enclosure opening, said flange extending into said enclosure opening, a resilient gasket carried on said flange, said doors having edges which rest upon and seal against said gasket when said doors are closed.

12. The truck of claim 7 further comprising heat resistant and insulating material lining the inner surface of said engine enclosure.

* * * * *